United States Patent
Baker et al.

(10) Patent No.: US 10,170,979 B2
(45) Date of Patent: *Jan. 1, 2019

(54) POINT OF LOAD REGULATOR SYNCHRONIZATION AND PHASE OFFSET

(71) Applicant: INTERNATIONAL BUSINESS MACHINES CORPORATION, Armonk, NY (US)

(72) Inventors: Anthony E. Baker, Stittsville (CA); Don R. Dignam, Ottawa (CA); Harvey Hum, Ottawa (CA); Jian Meng, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/397,063

(22) Filed: Jan. 3, 2017

(65) Prior Publication Data
US 2017/0117800 A1    Apr. 27, 2017

Related U.S. Application Data

(63) Continuation of application No. 14/258,235, filed on Apr. 22, 2014, now Pat. No. 9,570,983.

(51) Int. Cl.
*H02M 3/04*    (2006.01)
*H02M 3/158*    (2006.01)

(52) U.S. Cl.
CPC ........... *H02M 3/04* (2013.01); *H02M 3/1584* (2013.01); *H02M 2003/1586* (2013.01)

(58) Field of Classification Search
CPC ................. G05F 3/00; G05F 3/02; G05F 3/04
See application file for complete search history.

(56) References Cited

U.S. PATENT DOCUMENTS

| 9,570,983 B2 * | 2/2017 | Baker | H02M 3/1584 |
| 2004/0123167 A1 * | 6/2004 | Chapuis | H02J 1/102 |
| | | | 713/300 |

(Continued)

OTHER PUBLICATIONS

O'Malley, Eamon et al; "Digital control scheme for robust clock tuning and PWM phase synchronization in digitally pontrolled multi-POL applications." In Applied Power Electronics Conference and Exposition (APEC), 2010 Twenty-Fifth Annual IEEE, pp. 1922-1926. IEEE, 2010.

(Continued)

*Primary Examiner* — Adolf Berhane
*Assistant Examiner* — Afework Demisse
(74) *Attorney, Agent, or Firm* — ZIP Group PLLC

(57) ABSTRACT

An electronic system includes a multiple POL regulators that supply a regulated voltage to a component within the electronic system. A phase spreading scheme may be implemented so that the POL regulators operate under various phases to reduce voltage noise, high input capacitance, and high radiated emissions. One phase spreading scheme includes a single POL regulator controlling phase spreading so that the other POL regulators operate under different phases. Another phase spreading scheme includes an upstream POL regulator determining a phase offset that may be passed to a downstream POL regulator so that the downstream POL regulator may operate under a different phase relative to the upstream POL regulator.

20 Claims, 3 Drawing Sheets

(56) References Cited

U.S. PATENT DOCUMENTS

| | | |
|---|---|---|
| 2004/0174147 A1 | 9/2004 | Vinciarelli |
| 2006/0061214 A1 | 3/2006 | Chapuis |
| 2010/0013307 A1 | 1/2010 | Heineman et al. |
| 2013/0021009 A1 | 1/2013 | Waltman et al. |
| 2015/0303793 A1 | 10/2015 | Baker et al. |

OTHER PUBLICATIONS

Corradini, Luca et al; "Parameter-independent time-optimal digital control for point-of-load converters." Power Electronics, IEEE Transactions on 24, No. 10 (2009): 2235-224.

"Synchronization and phase spreading—3E Point of load regulators," Application Note 309 Ericsson Power Modules, Jan. 2014.

List of IBM Patents or Patent Applications Treated as Related, dated herewith.

\* cited by examiner

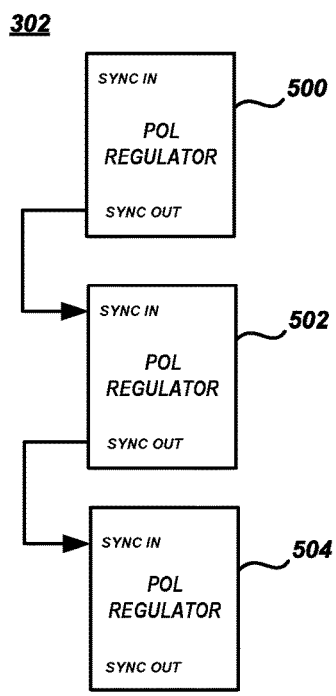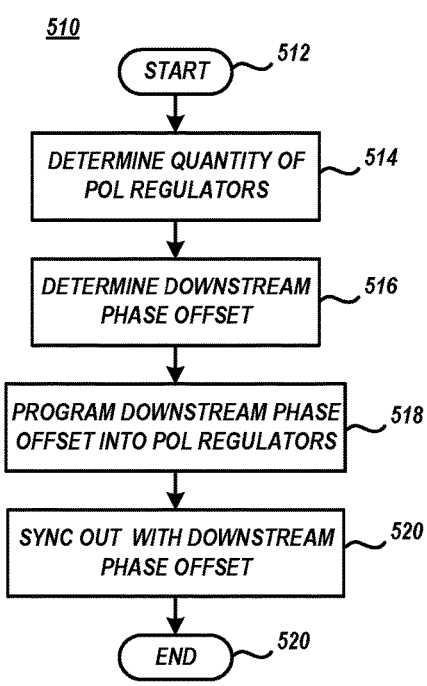
FIG. 4
FIG. 5

POINT OF LOAD REGULATOR SYNCHRONIZATION AND PHASE OFFSET

FIELD OF THE INVENTION

Embodiments of present invention generally relate to the field of electronics and, more specifically, relate to an electronic system that includes multiple point of load power regulators.

DESCRIPTION OF THE RELATED ART

Power supply voltage regulation schemes may convert high voltage AC current to a suitable voltage supply for electronic devices such as a computer system, general purpose server, network switch, personal computer, laptop, sub-notebooks, television, etc. or components such as electronics circuits within such devices. A power supply system may include, for example, a transformer, a rectifier, a filter, and a regulator.

Transformers step down high voltage AC to a lower voltage AC and rectifiers converts AC voltage to DC voltage. The DC output of rectifier may still have some variability and if so, the filter further flattens the DC voltage to have a smaller variability. The regulator effectively further removes DC voltage variability and outputs a regulated DC voltage utilized by the electronic device or component.

For some electronics implementations, a regulator scheme may be implemented that utilizes one or more point of load (POL) regulators local to the electronic component for which the DC voltage is supplied.

In electronic systems that implement multiple POLs the switching phase between the POLs may be delayed to reduce undesired effects in the system that may include a large peak current drawn from a POL input voltage, high input capacitance, and high radiated emissions due to synchronized edges of the switching frequency. Phase spreading is a method of reducing these effects.

One way of phase spreading is to allow the POLs to operate individually, from their own internally generated clock. This randomizes the occurrence of the switching frequency edges, which reduces the chances of large peak currents from the input source. Another way of phase spreading involves distributing phase edges of each POL in a group by operating them from a common switching clock. A single clock source is used for all POLs, each POL having its phase set to a different value throughout the cycle of the clock. For example in a group of three POLs the phases can be set 360°/3=120° from each other. This type of phase spreading reduces peak input current and input voltage ripple as well as reduces current stress to input capacitors. It also effectively reduces radiated emissions.

SUMMARY

In an embodiment of the present invention, an electronic system includes at least three point of load (POL) regulators that supply a regulated voltage to a component within the electronic system. The electronic system includes a master POL regulator that operates under a reference phase and communicates a first SYNC OUT signal that is offset from the reference phase by a first phase offset to a first controlled POL regulator and communicates a second SYNC OUT signal that is offset from the reference phase by a second phase offset to a second controlled POL regulator.

In yet another embodiment of the present invention, an electronic system includes at least three point of load (POL) regulators that supply a regulated voltage to a component within the electronic system. The electronic system includes a first POL regulator that operates under a first phase and communicates a first SYNC OUT signal to a second POL regulator that is offset from the first phase by a downstream phase offset. The second POL regulator operates under a second phase synced to the first SYNC OUT signal and communicates a second SYNC OUT signal to a third POL regulator that is offset from the second phase by the downstream phase offset. The third POL regulator operates under a third phase synced to the second SYNC OUT signal.

In yet another embodiment of the present invention, a phase spreading method is presented for an electronic system including at least three point of load (POL) regulators that supply a regulated voltage to a component within the electronic system. The phase spreading method includes synchronizing, with a master POL regulator, a reference phase to a clock, determining, with the master POL regulator, a first phase offset and a second phase offset, communicating, with the master POL regulator, a first SYNC OUT signal that is offset from the reference phase by the first phase offset to a first controlled POL regulator, and communicating, with the master POL regulator, a second SYNC OUT signal that is offset from the reference phase by the second phase offset to a second controlled POL regulator.

These and other embodiments, features, aspects, and advantages will become better understood with reference to the following description, appended claims, and accompanying drawings.

BRIEF DESCRIPTION OF THE DRAWINGS

FIG. 4 illustrates an exemplary multiple POL regulator group that includes a multiple POL regulators comprising a SYNC IN pin and a SYNC OUT pin, according to embodiments of the present invention.

FIG. 5. illustrates exemplary phase offset logic utilized by the multiple POL regulators, according to embodiments of the present invention.

DETAILED DESCRIPTION

Figure 1:
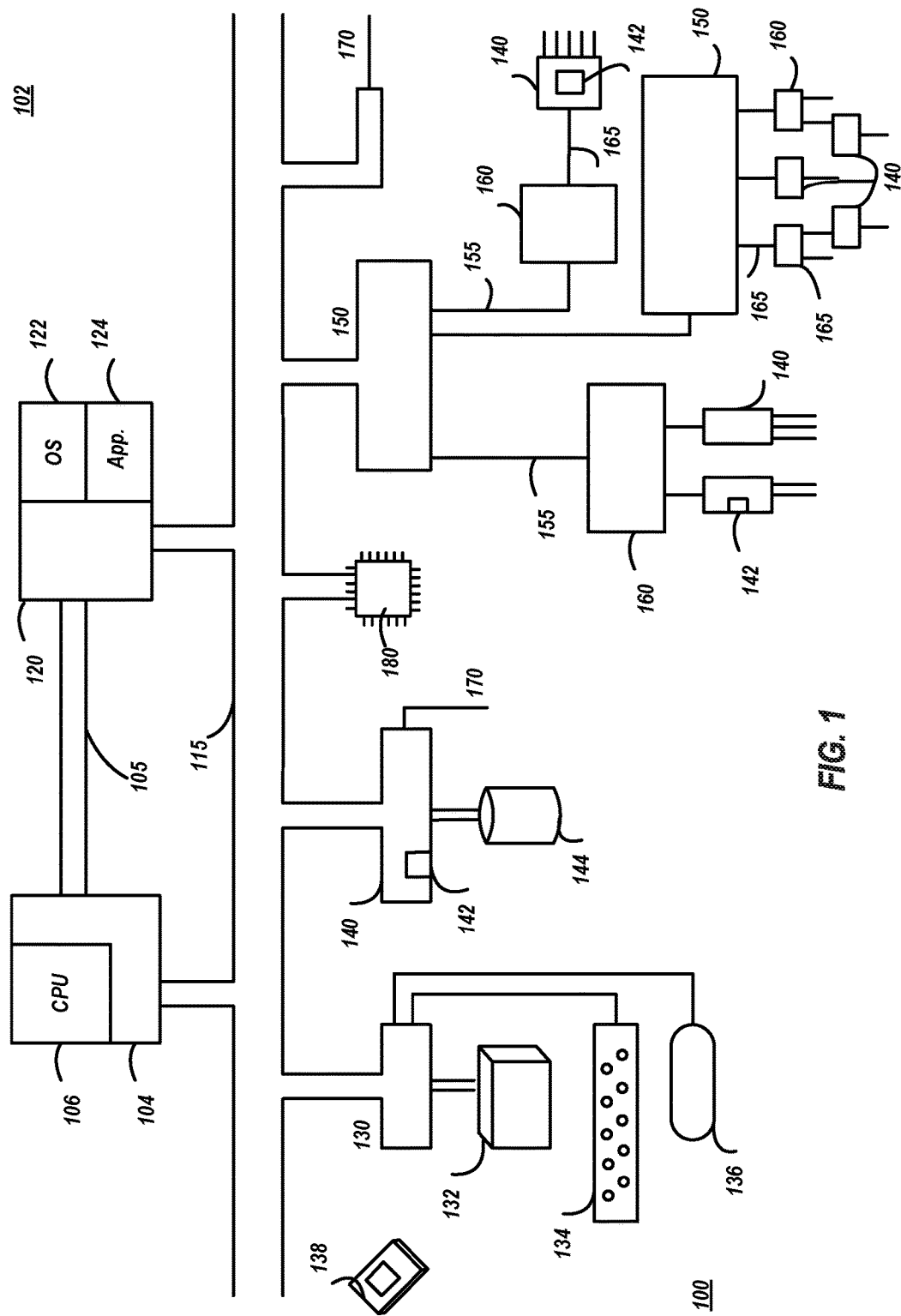
FIG. 1 illustrates components and an interconnection topology for an information handling system that may utilize or enable one or more embodiments the present invention.

FIG. 1 illustrates components and an interconnection topology for an information handling system, for example a electronic system 100 that may utilize or enable one or more embodiments the present invention. Electronic system 100 comprises a host 102 having a host processor complex 104 connected to a memory 120 by an internal bus 105 and/or a host system bus 115.

The host processor complex 104 has at least one general-purpose programmable processor unit (CPU) 106 that may execute program instructions stored in main memory 120. Although a single CPU 106 is shown in FIG. 1, it should be understood that a processor complex 104 may have multiple CPUs 106. Memory 120 or a portion of memory 120 may be included within the host processor complex 104 or connected to it via an internal bus system 105 or via a host system bus 115. Memory 120 may be for example a random access memory for storing data and/or program instructions. Though memory 120 is shown conceptually as a single monolithic entity, memory 120 may be arranged as a hierarchy of caches and other memory devices. In some instances, a hierarchy of cache memories is associated with CPU 106. Memory 120 may include an operating system (OS) 122 and applications 124. Operating system 122 may provide functions such as device drivers or interfaces, management of memory pages, management of multiple tasks, etc., as is known in the art. Applications 124 may be programs, procedures, algorithms, routines, instructions, software, etc. that directs what tasks electronic system 100 should accomplish and instructs how electronic system 100 should accomplish those tasks. Applications 124 may for example include a server software application whereby a network interface 170 may interact with the server software application to enable electronic system 100 to be a network server. Applications 124 may alternatively for example include a network switching application to enable electronic system 100 to be a network switch.

Host system bus 115 may support the transfer of data, commands, and other information between the host processor system 102 and other internal, peripheral, or external devices attached to it. Host system bus 115 may also support the communication of data between external devices independent of the host processor complex 102. While shown in simplified form as a single bus, the host system bus 115 may be structured as multiple buses which may be for example hierarchically arranged. Host system bus 115 may be connected to a myriad of external or peripheral devices such as a connection hub 130, an adapter 140, a multifunction adapter 150, a network 170, etc.

Various devices may be included within electronic system 100 and/or connected to electronic system 100. These devices may include a monitor or display 132, a keyboard 134, a mouse or other handheld device 136, and/or a printer 138. Display 132 may be a cathode-ray tube display, a flat panel display, or other display technology. One or more adapters 140 may support keyboard 134 and mouse 136; it being understood that other forms of input devices could be used. The number and types of devices shown in FIG. 1 are illustrative only and ordinary users of computer systems now know that a great variety of connected devices exist; e.g., microphones, speakers, infrared remote controls, wireless connected devices, etc. and therefore electronic system 100 is not limited to those devices illustrated in FIG. 1.

The host system bus 115 may also be connected to an adapter 140. Adapter 140 is an expansion device that may expand the functionalities of electronic system 100. For example, adapter 140 may be an input output (I/O) adapter connected to an external memory device 144, a graphics adapter including graphics processing complex that is connected to an external display 132, etc. External memory device 144 may be rotating magnetic disk storage, rotating or static optical drives, magnetic tape storage, FLASH memory, etc. Adapter 140 may include adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 may process incoming messages from the host processor complex 102 and generate and transmit response messages back to the host processor complex 102.

An adapter 140 may contain electronic components and logic to adapt or convert data of one protocol on one bus to another protocol on another bus. Therefore, adapters 140 may connect a wide variety of devices to the host computer system 102 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165. Various components may be connected to the primary bus 155 including, for example, an adapter 140, a bridge device 160, or another multifunction I/O processor or a multifunction adapter 150. The bridge device 160 bridges the primary bus 155 and a secondary bus 165 to which various adapters 140 may be connected. The adapters 140, the primary bus 155, and the secondary bus 165 may conform to the PCI/PCI-X or other industry bus specification. One skilled in the art realizes, however, that the implementation is not limited to a PCI/PCI-X or a SCSI or USB bus implementation but is applicable to any electrical, optical, or wireless bus where data must be efficiently transferred.

Network interface 170 provides an operative connection for transmission of data to and from a network. The network may be an internet but could also be any smaller self-contained network such as an intranet, a WAN, a LAN, or other internal or external network using; e.g., telephone transmission lines, cable services, satellites, fiber optics, T1 lines, wireless, etc., and any other various technologies.

Electronic system 100 may also include one or more application specific integrated circuits (ASIC) 180 such as a field programmable gate array (FPGA) a microprocessor, programmable memory blocks, Electrically Erasable Programmable Read-Only Memory (EEPROM), a system-on-chip, etc. connected to CPU 102 and and/or memory 120 via system bus 115.

Electronic system 100 may be a server, computer, etc. or a simpler device such as a network switch, network terminal, a thin client, a terminal-like device, a voice response unit, mobile device, etc. The convergence of computing, telecommunications and consumer electronics is causing a tremendous growth in the number and variety of pervasive mobile devices as clients. This mobile architecture enables the multitude of client devices including laptops, sub-notebooks, handheld computers such as personal digital assistants and companion devices, and mobile appliances such as smart phones, pagers, simple messaging devices and wearable devices.

In exemplary embodiments, the electronic system 100 may be a mobile device that comprises one or more input devices, display 132, one or more capture devices, memory 120, etc. Input device(s) may be any system and/or device capable of receiving input from a user. Examples of input devices include, but are not limited to, a mouse, a key board, a microphone, a touch screen, and the like input devices. In the various embodiments, each input device is in communication with display 132. In one embodiment, display 132 includes touch screen such that display 132 and the input device are integrated devices.

In certain embodiments some or all of the devices shown and described in FIG. 1 may be included in a discrete electronic system 100 (e.g. display 132, memory device 144, etc. are included within electronic system 100, etc.). In other embodiments some of the devices shown and described in FIG. 1 may be separate, peripheral, or external to electronic system 100 (e.g. multiple modular computer systems may share a single large database, an external display 132 is peripherally connected to electronic system 100, etc.). Further, the devices shown and described in FIG. 1 may each include hardware and/or software device drivers, interfaces, registers, buffers, or the like to allow for effective communication between devices within the electronic system 100 and between other electronic systems within network 170.

The electronic system shown in FIG. 1 is intended to be a simplified representation, it being understood that many variations in system configuration are possible in addition to those specifically mentioned here. For instance, though electronic system 100 may be a portable device as described above, electronic system 100 may also be a larger computer system such as a general purpose server.

Various embodiments of the present invention pertain to methods that may be implemented upon or by electronic system 100. When electronic system 100 performs particular tasks according to one or more methods described herein, such electronic system 100 becomes a special purpose machine particular to those one or more methods.

Figure 2:
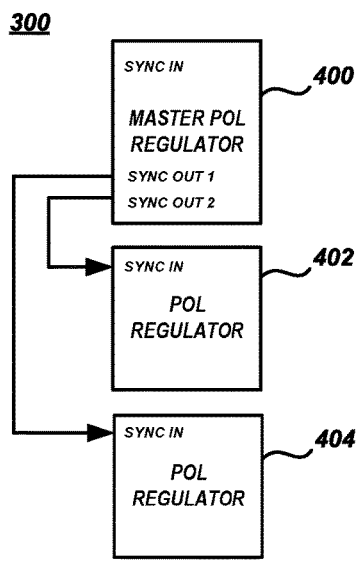
FIG. 2 illustrates an exemplary multiple POL regulator group that includes a master POL regulator according to embodiments of the present invention.

FIG. 2 illustrates an exemplary multiple POL regulator group 300 that includes master POL regulator 400 and a plurality of controlled regulators 402, 404, according to embodiments of the present invention.

Master POL regulator 400 and controlled regulators 402, 404 are generally step-down DC-DC converter positioned close to an electronic system 100 components, such as ASIC 180. Generally, by utilizing master POL regulator 400 and controlled regulators 402, 404 it is possible to eliminate the long wiring between a power supply and the electronic system 100 component. Multiple POL regulators, such as one master POL regulator 400 and two controller regulators 402, 404, may be utilized to provide a requisite voltage to the electronic system 100 component that may not be achieved by a single POL regulator.

The master POL regulator 400 includes a plurality of SYNC OUT pins. In certain embodiments, the specific number of SYNC OUT pins equals the number of controlled POL regulators in the multiple POL group 300. Controlled POL regulators 402, 404 each include a SYNC IN pin that may be connected to an associated SYNC OUT pin of master POL regulator 400. Controlled POL regulators 402, 404 will check for a clock signal on the SYNC IN pin each time it is enabled. An internal oscillator within controlled POL regulators 402, 404 will then synchronize with the SYNC OUT from master POL regulator 400. In certain embodiments, the master POL regulator 400 also includes a SYNC IN pin. In such embodiments, master POL regulator 400 will also check for a clock signal on the SYNC IN pin and an internal oscillator within master POL regulator will synchronize with an external clock (e.g. clock of electronic system 100 component for which voltage is being supplied, etc.).

Master POL regulator 400 also includes phase offset logic 410 used to control phase offsets of the plurality of SYNC OUT signals for achieving phase spreading. For example, master POL regulator 400 will drive a first phased oscillator signal onto the first SYNC OUT pin so a first controlled POL regulator may subsequently sync and operate under the first phase and master POL regulator 400 will drive a second phased oscillator signal onto the second SYNC OUT pin so a second controlled POL regulator may subsequently sync and operate under the second phase.

Figure 3:
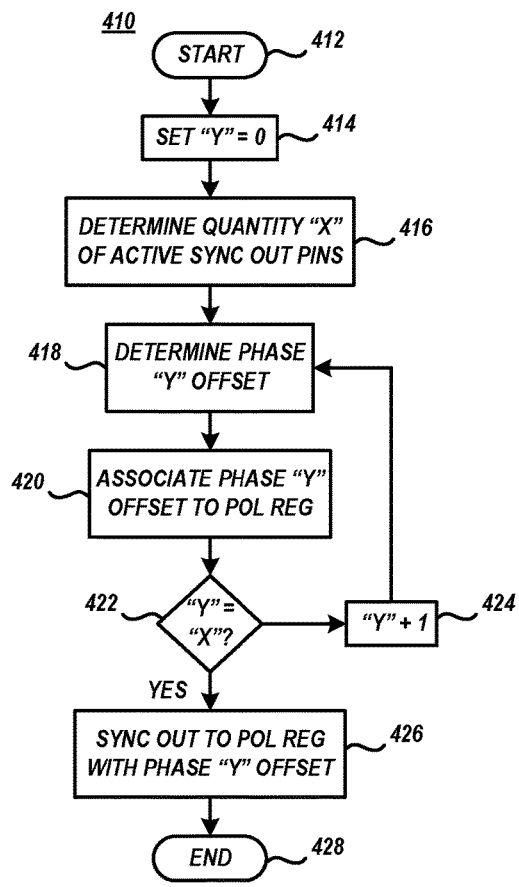
FIG. 3. illustrates exemplary phase offset logic utilized by the master POL regulator, according to embodiments of the present invention.

FIG. 3 illustrates exemplary phase offset logic 410, according to embodiments of the present invention. Phase offset logic 410 may be implemented by e.g. a controller or other similar processing unit included within master POL regulator 400. Phase offset logic 410 begins at block 412 and may continue with master POL regulator 400 sets an iteration value "Y" equal to zero.

Phase offset logic 410 may continue with master POL regulator 400 determining the number "X" of active SYNC OUT pins (block 416). In other words, master POL regulator 400 determines the number of controlled POL regulators synced thereto. For example, a master POL regulator 400 may include 6 SYNC OUT pins and a multiple POL group 300 may include 4 POL regulators (i.e. one master POL regulator 400 and three controlled POL regulators). In this example, master POL regulator 400 may dynamically determine that three controlled POL regulators are synced thereto. In another example, it may be known e.g. during prior electronic system 100 manufacture, etc. that a POL regulator group 300 includes three POL regulators and the number of controlled POL regulators may be programmed into master POL regulator 400.

Phase offset logic 410 may continue with master POL regulator 400 determining phase "Y" offset (block 418). In certain embodiments, phase offsets may be determined by dividing the number of POL regulators in group 300 by three hundred sixty degrees multiplied by an iteration value "Y". For example, where iteration value "Y" equals zero, master POL regulator 400 determines a reference phase with no offset. In certain embodiments, the reference phase is the clock phase of the master POL regulator 400. In other embodiments, the reference phase may be assigned to another POL regulator in group 300 as is further described herein. The reference phase is a particular clock reference that which other POL regulators in group 300 may be offset relative thereto. Where iteration value "Y" equals one, master POL regulator 400 determines a first phase offset. For example, if three POL regulators are in group 300, as is shown in FIG. 2, the first phase offset is 120° (360°/3=120°× "Y"). During the next iteration, where iteration value "Y" equals two, master POL regulator 400 determines a second phase offset. Continuing with three POL regulators in group 300, the second phase offset is 240° (360°/3=120°×"Y").

Phase offset logic 410 may continue with assigning the "Y" phase offset to a particular controlled POL regulator within group 300 (block 420). For example, the reference phase may be assigned by master POL regulator 400 to itself and the offset phases may be assigned by driving a respective oscillator signal with the applicable phase offset (block 426). For example, master POL regulator 400 may assign the first phase offset to controlled POL regulator 404 by driving an oscillator signal offset from the reference phase by the first phase offset onto the SYNC OUT pin connected to POL regulator 404. Master POL regulator 400 may assign the second phase offset to controlled POL regulator 402 by driving an oscillator signal offset from the reference phase by the second phase offset onto the SYNC OUT pin connected to POL regulator 402.

In another example, the master POL regulator may assign the reference phase to controlled POL regulator 402 by driving an oscillator signal not offset from the reference phase onto the SYNC OUT pin connected to POL regulator 402. Master POL regulator 400 may assign the first phase offset to controlled POL regulator 404 by driving an oscillator signal offset from the reference phase by the first phase offset onto the SYNC OUT pin connected to POL regulator 404. Master POL regulator 400 may then assign the second phase offset to itself by driving its oscillator signal offset from the internal/external clock by the second phase offset. In other words, the various determined phases may be arbitrarily assigned to respective POL regulators within group 300.

In this manner the POL regulators within group 300 may operate under different phases to achieve phase spreading to reduce voltage noise, high input capacitance, and high radiated emissions.

Phase offset logic 410 may continue by determining if all of the controlled POL regulators have been assigned a phase offset (block 422) and if not iteration value "Y" is incremented and phase offset logic 410 returns to block 418 to determine a subsequent phase offset. Phase offset logic 410 ends at block 428.

FIG. 4 illustrates an exemplary multiple POL regulator group 302 that includes a multiple POL regulators 500, 502, 504 each comprising a SYNC IN pin and a SYNC OUT pin, according to embodiments of the present invention.

POL regulators 500, 502, 503 are generally step-down DC-DC converter positioned close to an electronic system 100 components, such as ASIC 180. Generally, by utilizing POL regulators 500, 502, 503 it is possible to eliminate the long wiring between a power supply and the electronic system 100 component. The multiple POL regulators 500, 502, 503 may be utilized to provide a requisite voltage to the electronic system 100 component that may not be achieved by a single POL regulator.

Each POL regulator 500, 502, 503 includes a SYNC OUT pin and a SYNC IN pin. A first POL regulator 500 may include an internal clock or it may check for a clock signal on its SYNC IN pin. An internal oscillator within POL regulator 500 will synchronize with either the external clock (e.g. clock of electronic system 100 component for which voltage is being supplied, etc.) or the internal clock.

The SYNC IN pin of a second POL regulator 502 is connected to the SYNC OUT pin of POL regulator 500. POL regulator 502 will check for a clock signal on its SYNC IN pin each time it is enabled. An internal oscillator within POL regulator 502 then synchronizes with the SYNC OUT from POL regulator 500. Likewise, The SYNC IN pin of a third POL regulator 504 is connected to the SYNC OUT pin of POL regulator 502. POL regulator 504 checks for a clock signal on its SYNC IN pin each time it is enabled. An internal oscillator within POL regulator 504 then synchronizes with the SYNC OUT from POL regulator 502.

Each POL regulator 500, 502, 504 also includes phase offset logic 510 used to control phase offsets of the plurality of SYNC OUT signals for achieving phase spreading. For example, by implementing phase offset logic 510 each POL regulator 500, 502, 504 offsets its oscillator signal on its SYNC OUT pin so a downstream POL regulator may subsequently sync and operate upon a relatively offset phase.

FIG. 5. illustrates exemplary phase offset logic 510 utilized by the multiple POL regulators 500, 502, 504, according to embodiments of the present invention. Phase offset logic 510 may be implemented by e.g. a controller or other similar processing unit included within POL regulators 500, 502, 504.

Phase offset logic 510 begins at block 512 and may continue with at least one of POL regulators 500, 502, 504 determining the quantity of POL regulators within group 302 (block 514). In certain embodiments, all of the POL regulators 500, 502, 504 in group 302 work together to collectively determine the quantity of POL regulators within group 302 by e.g. downstream POL regulators passing an identify signal to the upstream POL regulator. The first POL regulator 500 may assemble the identify and count the identify signals to determining the quantity of POL regulators within group 302. In another example, it may be known e.g. during prior electronic system 100 manufacture, etc. that POL regulator group 302 includes three POL regulators 500, 502, 504 and the number of controlled POL regulators may be programmed into at least one POL regulator 500, 502, 504.

Phase offset logic 510 may continue with at least one of POL regulators 500, 502, 504 determining a downstream phase offset (block 516). The downstream phase offset is used by each of the POL regulators 500, 502, 504 to offset its SYNC OUT signal relative to the phase itself is operating. In certain embodiments, the various downstream phase offsets of group 302 are equal. The downstream phase offset may be determined by dividing the number of POL regulators in group 302 by three hundred sixty degrees. Therefore, if three POL regulators are included in group 302, the downstream phase offset is 120°. Therefore, each of the POL regulators 500, 502, 504 may offset its SYNC OUT signal 120° relative to the phase itself is operating. In certain embodiments, the various downstream offsets are all delayed relative to the operating phase of the upstream POL regulator.

Phase offset logic 510 may continue with programming the downstream phase offset into each POL regulator 500, 502, 504 within group 302 (block 518) so that the downstream phase offset may be used by each of the POL regulators 500, 502, 504 to offset its SYNC OUT signal relative to the phase itself is operating (block 520). In this manner phase spreading may be achieved by the POL regulators within group 302 each operating under different phases to reduce voltage noise, high input capacitance, and high radiated emissions. Phase offset logic 510 ends at block 522.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. An electronic system including at least three point of load (POL) regulators that supply a regulated voltage to a component within the electronic system, the electronic system comprising:
    a master POL regulator that operates under a reference phase and communicates a first SYNC OUT signal that is offset from the reference phase by a first phase offset to a first controlled POL regulator and communicates a second SYNC OUT signal that is offset from the reference phase by a second phase offset to a second controlled POL regulator.

2. The electronic system of claim 1, wherein the first SYNC OUT signal is a first oscillator signal that is offset from the reference phase by the first phase offset.

3. The electronic system of claim 1, wherein the second SYNC OUT signal is a second oscillator signal that is offset from the reference phase by the second phase offset.

4. The electronic system of claim 1, wherein the master POL regulator comprises an internal clock to which the master POL regulator synchronizes the reference phase.

5. The electronic system of claim 1, wherein the master POL regulator further receives an external clock signal to which the master POL regulator synchronizes the reference phase.

6. An electronic system including at least three point of load (POL) regulators that supply a regulated voltage to a component within the electronic system, the electronic system comprising:
   a first POL regulator that operates under a first phase and communicates a first SYNC OUT signal to a second POL regulator that is offset from the first phase by a downstream phase offset;
   wherein the second POL regulator operates under a second phase synced to the first SYNC OUT signal and communicates a second SYNC OUT signal to a third POL regulator that is offset from the second phase by the downstream phase offset; and
   wherein the third POL regulator operates under a third phase synced to the second SYNC OUT signal.

7. The electronic system of claim 6, wherein the first SYNC OUT signal is a first oscillator signal that is offset from the first phase by the downstream phase offset.

8. The electronic system of claim 7, wherein the second SYNC OUT signal is a second oscillator signal that is offset from the second phase by the downstream phase offset.

9. The electronic system of claim 6, wherein the first POL regulator further comprises an internal clock to which the first POL regulator synchronizes the first phase.

10. The electronic system of claim 6, wherein the first POL receives an external clock signal to which the first POL regulator synchronizes the first phase.

11. A phase spreading method for an electronic system including at least three point of load (POL) regulators that supply a regulated voltage to a component within the electronic system, the phase spreading method comprising:
   synchronizing, with a master POL regulator, a reference phase to a clock;
   determining, with the master POL regulator, a first phase offset and a second phase offset;
   communicating, with the master POL regulator, a first SYNC OUT signal that is offset from the reference phase by the first phase offset to a first controlled POL regulator; and
   communicating, with the master POL regulator, a second SYNC OUT signal that is offset from the reference phase by the second phase offset to a second controlled POL regulator.

12. The phase spreading method of claim 11, further comprising:
   receiving, with the first controlled POL regulator, the first SYNC OUT signal.

13. The phase spreading method of claim 12, further comprising:
   receiving, with the second controlled POL regulator, the second SYNC OUT signal.

14. The phase spreading method of claim 11, wherein the clock to which the master POL regulator synchronizes the reference phase is comprised within the master POL regulator.

15. The phase spreading method of claim 11, wherein the clock to which the master POL regulator synchronizes the reference phase is external to the master POL regulator.

16. The phase spreading method of claim 11, wherein determining the first phase offset and the second phase offset further comprises:
   determining, with the master POL regulator, the quantity of controlled POL regulators.

17. The phase spreading method of claim 16, wherein determining the first phase offset further comprises:
   dividing, with the master POL regulator, the quantity of controlled POL regulators by 360° multiplied by an iteration value associated with the first phase.

18. The phase spreading method of claim 16, wherein determining the second phase offset further comprises:
   dividing, with the master POL regulator, the quantity of controlled POL regulators by 360° multiplied by an iteration value associated with the second phase.

19. The phase spreading method of claim 11, wherein the first SYNC OUT signal is an first oscillator signal that is offset from the reference phase by the first phase offset and the second SYNC OUT signal is an second oscillator signal that is offset from the reference phase by the second phase offset.

20. The phase spreading method of claim 19, wherein the first oscillator signal is offset from the reference phase and the second oscillator signal is offset from the first oscillator signal by the same degree.

* * * * *